United States Patent
Roca et al.

(10) Patent No.: US 8,712,700 B2
(45) Date of Patent: Apr. 29, 2014

(54) METHOD AND APPARATUS FOR DETECTION OF THE REMOTE ORIGIN FRACTION OF RADON PRESENT IN A MEASURING SITE

(75) Inventors: Vincenzo Roca, Caserta (IT);
Mariagabriella Pugliese, Naples (IT);
Carlo Sabbarese, Calvanico (IT);
Gennaro Venoso, Pozzuoli (IT)

(73) Assignee: Istituto Nazionale di Fisica Nucleare, Frascati (Roma) (IT)

(*) Notice: Subject to any disclaimer, the term of this patent is extended or adjusted under 35 U.S.C. 154(b) by 251 days.

(21) Appl. No.: 13/003,298

(22) PCT Filed: Jul. 10, 2008

(86) PCT No.: PCT/IB2008/052788
§ 371 (c)(1),
(2), (4) Date: Feb. 25, 2011

(87) PCT Pub. No.: WO2010/004366
PCT Pub. Date: Jan. 14, 2010

(65) Prior Publication Data
US 2011/0178722 A1  Jul. 21, 2011

(30) Foreign Application Priority Data
Jul. 9, 2008 (IT) .............................. PD2008A0204

(51) Int. Cl.
*G01N 31/00* (2006.01)
*G01T 1/178* (2006.01)

(52) U.S. Cl.
CPC .................................. *G01T 1/178* (2013.01)
USPC .......................................................... 702/24

(58) Field of Classification Search
CPC ...................................................... G01T 1/178
USPC ............... 702/24, 194, 196; 250/370.02, 253, 250/395; 73/23.2
See application file for complete search history.

(56) References Cited

U.S. PATENT DOCUMENTS

| | | | | |
|---|---|---|---|---|
| 4,975,574 A * | 12/1990 | Lucas | | 250/253 |
| 2009/0095920 A1* | 4/2009 | Oliver et al. | | 250/473.1 |
| 2009/0200473 A1* | 8/2009 | Uematsu et al. | | 250/362 |

FOREIGN PATENT DOCUMENTS

| GB | 2 368 185 | * | 4/2002 |
|---|---|---|---|
| GB | 2 428 088 | * | 1/2007 |

(Continued)

OTHER PUBLICATIONS

Cole, A.J.; Statistical Models for Nuclear Decay: From Evaporation to Vaporization; 2000; Taylor and Francis; Chapter 2 Section 2.4.*

(Continued)

*Primary Examiner* — Michael Nghiem
(74) *Attorney, Agent, or Firm* — Themis Law

(57) ABSTRACT

A method and an apparatus for detecting the remote origin fraction of $^{222}$Rn present in a measuring site (Z) for the monitoring of dynamic phenomena inside the land crust, comprising the following steps: a) analysis of the measuring site (Z) in order to state a typical ratio between $^{222}$Rn of local origin and $^{220}$Rn of local origin; b) measurement, at preset time intervals, of alpha spectroscopy in the measuring site (Z) by a measuring chamber (2); c) processing of said alpha spectroscopy in order to find the concentrations of $^{222}$Rn and $^{220}$Rn present in the measuring site (Z); d) determination of the concentration of $^{222}$Rn of local origin by multiplying the concentration of $^{220}$Rn with the typical ratio; subtraction of the concentration of $^{222}$Rn of local origin from the concentration of $^{222}$Rn to obtain the concentration of the remote origin fraction Of $^{222}$Rn.

9 Claims, 2 Drawing Sheets

(56) References Cited

FOREIGN PATENT DOCUMENTS

| GB | 2 428 291 | * | 1/2007 |
| WO | WO 2006/070139 | * | 7/2006 |

OTHER PUBLICATIONS

Pillai, S.O.; Rudiments of Material Science; 2007; p. 265.*
De Martino et al.; "Radon Emanation and Exhalation Rates from Soils Measured with an Electrostatic Collector"; 1998; Applied Radiation Isotopes; vol. 49 No. 4; pp. 407-413.*
Venoso G et al: "Geophysical applications of radon measurements in soils" Proceedings of the 8th International Workshop on the Geological Aspects of Radon Risk Mapping, Sep. 26-30, 2006, Prague, Czech Republic, Sep. 30, 2006, p. 1.

Roca V et al: "A monitor for continuous and remote control of radon level and environmental parameters", Nuclear Science Symposium Conference Record, 2004 IEEE, IEEE, Piscataway, NJ, USA, vol. 3, Oct. 16, 2004, pp. 1563-1566.
De Martino S et al: "Radon Emanation and Exhalation Rates from Soils Measured with an Electrostatic Collector", Applied Radiation and Isotopes, Elsevier, Oxford, GB,vol. 49, No. 4, Apr. 1, 1998, pp. 407-413.
Roca V et al: "The influence of environmental parameters in electrostatic cell radon monitor response", Applied Radiation and Isotopes, Elsevier, Oxford, GB, vol. 61, No. 2-3, Aug. 1, 2004, pp. 243-247.
Ghosh P C et al: "A technique for discrimination of radon ($<222>$Rn) and thoron ($<220>$Rn) in soil-gas using solid state nuclear track detectors" Nuclear Tracks and Radiation Measurements, Pergamon Press, Oxford, GB, vol. 9, Mo. 1,Jan. 1, 1984, pp. 23-27.

* cited by examiner

METHOD AND APPARATUS FOR DETECTION OF THE REMOTE ORIGIN FRACTION OF RADON PRESENT IN A MEASURING SITE

FIELD OF THE INVENTION

The present invention finds application in the technical field of instruments for monitoring radioactive emissions and particularly relates to a method and an apparatus therefor.

More specifically, the present invention discloses a method and an apparatus for continuously detecting $^{222}$Rn in the ground and, particularly for discriminating the contribution of $^{222}$Rn of remote origin, which is directly linked to geophysical phenomena.

BACKGROUND ART

Continuous and accurate monitoring of radioactive emissions within particular areas is known to be, in certain cases, of both sanitary and scientific interest.

For sanitary purposes, as defined by many national and local regulations, such detections are performed in the air of spa resorts, where the concentration of radioactive particles can considerably change throughout the various steps of the activity. For the same reasons, radon exhalation is required to be detected and monitored in tunnels, mines and underground laboratories, and radiation emission levels must be monitored in any site that involves a high exposure risk, such as nuclear power stations or anyway operating reactors.

For scientific purposes, particularly relating the study of geophysics, monitoring of radon concentration in the ground is important for correlating it, for instance, to seismic and/or volcanic activity in certain zones.

As a matter of fact, it is known that, of the radioactivity that is found over a site, the highest contribution is given by the presence of radioactive gases, such as radon ($^{222}$Rn) and thoron ($^{220}$Rn), of local origin, which are the expression of natural emissions from the ground or the area to be monitored.

Nonetheless, in the above monitoring activities in addition to in situ $^{222}$Rn, i.e. generated by its precursor radionuclides within a confined area proximate the measuring point, it is especially important to detect the remote origin fraction, i.e. emitted far from the place of measurement, which is more difficult to estimate. Such fraction may be sometimes deemed to be a useful parameter for studying abnormal geophysical phenomena. In this respect, it would be very useful to isolate the local fraction of $^{222}$Rn from the total detected amount, which might also be greater than the remote origin fraction.

For this purpose, adequate measuring instruments are required, which combine continuous radon detection over a site with an analysis method that allows to determine remote origin gas fraction from the measurements and from careful prior characterization of the site.

A number of radioactive monitoring instruments are known which are able to differentiate individual nuclide contributions. These known instruments use spectroscopic analysis as well as methods for estimating background radiation interference in the accuracy of measurement. Most of these instruments provide simultaneous measurement, within the detection apparatus, of certain ambient parameters, whose values might affect the efficiency and accuracy of individual nuclide detection. However, none of them uses a method that allows differentiation of remote and local radon fractions.

For example, patents GB 2 428 088 and GB 2 428 291 disclose apparatus that use methods for detecting alpha or beta particles deriving from uranium or transuranic elements, in which measurement is generally affected by the interference of isotopes such as radon and thoron of "natural" origin. In an attempt to correct such measurement detection of air pressure and temperature within the detector has been proposed, whose values influence the measured spectrum. Nonetheless, in the above mentioned apparatus radon isotopes are only measured as measurement interference factors, whose contribution has to be subtracted from measurement.

The apparatus of GB 2 368 185 and WO 2006/070139 similarly use sensors for detecting temperature and pressure within the measuring instrument and in the ground in which radon concentration is to be measured. However, this technique does not allow to differentiate local and remote origin radon contributions.

SUMMARY OF THE INVENTION

The main object of the present invention is to obviate the above drawbacks by providing a method and consequently an apparatus that can correctly detect the remote origin $^{222}$Rn fraction present in a measuring site.

A particular object of the present invention is to provide a method that allows measurement of the remote origin $^{222}$Rn fraction by separating it from the one that has been locally detected in the measuring site.

A further object of the present invention is to allow correction of measurements from the influence of ambient parameters both on detector operation and on the process of gas exhalation from the ground within the measuring site.

These and other objects, as better explained hereafter, are fulfilled by a method for detection of the remote origin fraction of $^{222}$Rn present in a measuring site as defined hereinafter.

Particularly, this method, suitable for monitoring dynamic phenomena inside the land crust, comprising the following steps:
a) analyzing of the measuring site (Z) to determine a typical ratio between $^{222}$Rn of local origin and $^{220}$Rn of local origin;
b) measuring, at predetermined time intervals, the alpha spectroscopy in the measuring site by means of an appropriate measuring chamber;
c) processing said alpha spectroscopy in order to find the concentrations of $^{222}$Rn and $^{220}$Rn present in the measuring site;
d) determining the concentration of the $^{222}$Rn of local origin by multiplying the concentration of $^{220}$Rn with said typical ratio;
e) subtracting the concentration of $^{222}$Rn of local origin from the concentration of the detected $^{222}$Rn to obtain the concentration of the remote origin fraction of $^{222}$Rn.

In summary, the method provides analysis of the measuring site in order to state a typical ratio between $^{222}$Rn of local origin and $^{220}$Rn of local origin. Specifically, this typical ratio is the ratio between the emission coefficients $\epsilon_{Rn}$ and $\epsilon_{Th}$ of the two isotopes of a ground sample from the measuring site.

According to one aspect of the invention, the detection accuracy is increased by measuring, at the same time as alpha spectroscopy, the ambient parameters of pressure, temperature and humidity at the air intake in the measuring site.

As better explained hereinafter, this allows correction of the emission coefficients of local origin $^{222}$Rn and $^{220}$Rn according to such parameters of humidity, pressure and temperature.

The measure is improved by detecting the ambient parameters of pressure, temperature and humidity also in the measuring chamber, in such a manner to correct the detection efficiency, as shown in detail below.

According to a second aspect, the invention provides an apparatus for detection of the remote origin fraction of $^{222}$Rn present in a measuring site, which is adapted to carry out the above method, as defined hereinafter.

Such apparatus comprises:
- at least one measuring chamber designed for receiving of air samples drawn from the measuring site and for performing thereon an alpha spectroscopy;
- at least one first plurality of sensors for detecting ambient parameters of pressure, temperature and humidity inside said measuring chamber;
- at least one second plurality of sensors for detecting ambient parameters of pressure, temperature and humidity at the air intake in the measuring site;
- at least one programmable computer for processing data coming from the sensors and the measuring chamber;
- means for connecting said programmable computer with said sensors and said measuring chamber;
- and is characterized in that said programmable computer comprises storage means to memorize a computer program product executable to calculate the quantities of $^{222}$Rn and of $^{220}$Rn present in said zone to be measured (Z), to calculate the quantity of $^{222}$Rn of local origin by multiplying said quantity of said $^{220}$Rn for a typical ratio between $^{222}$Rn of local origin and $^{220}$Rn of local origin and subtracting from said quantity of said $^{222}$Rn said quantity of said $^{222}$Rn of local origin to obtain said remote origin fraction of $^{222}$Rn.

According to another aspect of the invention, the apparatus has a modular control unit, to which the measuring chamber and any additional radiation detectors and sensors are connected. This modular control unit is connected to the programmable computer via said connection means, which preferably consist of Ethernet® interfaces.

Suitably, the connection means are of wireless type. This allows connection of one or more measuring chambers, with their respective sensors for detecting internal and external ambient parameters to a computer remote from the zone to be monitored. This is useful in any situation, but particularly when monitoring volcanic zones or the like, where an operator cannot stay for long times or where the computer might be subjected to damages due to adverse environmental conditions.

BRIEF DESCRIPTION OF THE DRAWINGS

Further features and advantages of the invention will be more apparent from the detailed description of a few preferred, non-exclusive embodiments of the method and apparatus of the invention, which are described by way of non-limiting examples with the help of the annexed drawings, in which.

DETAILED DESCRIPTION OF A PREFERRED EMBODIMENT

Figure 1:
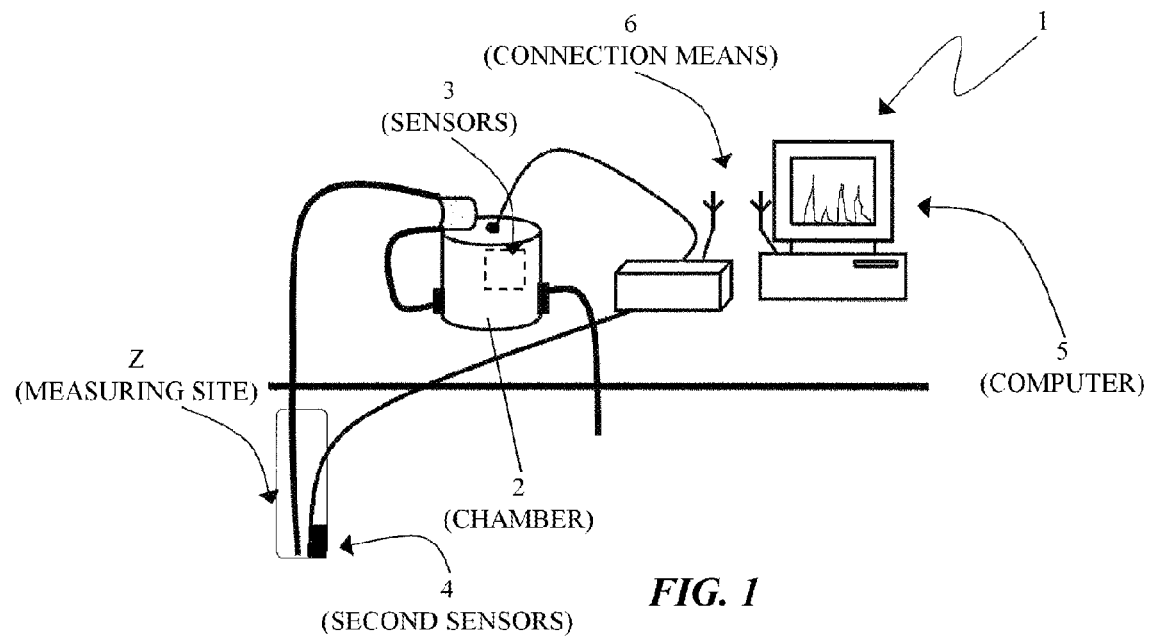
FIG. 1 shows an apparatus for detection of the remote origin fraction of $^{222}$Rn present in a measuring site according to the invention.

Referring to FIG. 1, there is shown an apparatus 1 for detection of the remote origin fraction of $^{222}$Rn in a measuring site Z.

Particularly, the figure shows a measuring chamber 2 which collects air sucked in from the site Z for performing alpha spectroscopy thereon.

It is primarily noted that, before assessing the relationship between abnormal $^{222}$Rn conditions and a natural phenomenon, such as an earthquake or a volcanic eruption, the measured concentration values have to be made as independent as possible of the measuring chambers of the chamber 2, of the weather conditions of surface air, such as wind and rain, and of the interference of radioactive particles of local origin, particularly $^{220}$Rn and $^{222}$Rn. These latter are not affected by the remote phenomenon but strictly depend on the conditions of ambient parameters in the measuring site, specifically humidity.

The influence of measuring conditions in the chamber 2 is eliminated by analyzing the chamber 2 and namely by continuously measuring its internal ambient parameters, such as pressure, humidity and temperature, using a first plurality of sensors 3, that will be analyzed in greater detail below.

The influence of the second factor, i.e. the weather conditions in the measuring site, may be considerably reduced by measuring $^{222}$Rn concentration in underground air, drawn from a depth of at least one meter.

Nonetheless, radon flow proximate to the measuring site also depends on how much gas is exhaled from the surrounding ground, which eventually depends on the weather conditions directly proximate the drawing site. For this reason, a second plurality of sensors 4 is provided for detecting the ambient parameters of pressure, temperature and humidity in the measuring site Z, to check whether the change in radon concentration is affected by these parameters, and if this is the case, to appropriately correct the measurement as explained in detail hereafter.

The measuring chamber 2, which is preferably an electrostatic chamber, performs alpha spectroscopy on the measuring site Z. Both the results of this spectroscopy and the values detected by the sensors 3, 4, are transmitted to a programmable computer 5 via connection means 6.

In accordance with another aspect of the invention, the connection means 6 are advantageously of the wireless type, to allow the measuring chamber 2 and the plurality of sensors 3 and 4 for detection of ambient conditions inside and outside the chamber 2, to be installed in hardly accessible places, without requiring wired connections to the computer 5 or, as applicable, without equipping the chamber 2 with a separate programmable computer.

If the programmable computer 5 is located remotely from the measuring chamber 2 and the sensors 3, 4, then it will be desirable to use a modular control unit to be placed on the measuring site, with the measuring chamber, any further radiation detectors and the sensors connected thereto. This modular control unit is connected to the programmable computer via said connection means, which preferably consist of Ethernet® interfaces.

This also provides protection to both the operator and the computer 5, especially when the apparatus 1 of the invention is used for volcanic activity monitoring.

It shall also be noted that this allows the use of multiple measuring chambers 2 for simultaneous monitoring of as many zones Z, so that large amounts of data can be handled without overloading local storages. This allows detections to occur at a high rate and provides high accuracy and reliability.

The programmable computer 5 uses the received data to find $^{222}$Rn and $^{220}$Rn concentrations in the measuring site Z.

According to the invention, the computer 5 comprises means for storage of a computer program product executable by the computer 5 to calculate the quantity of local origin $^{222}$Rn by multiplying the quantity of $^{220}$Rn for a typical ratio between $^{222}$Rn of local origin and $^{220}$Rn of local origin and subtracting from the quantity of $^{222}$Rn as detected in the measuring chamber, the quantity of $^{222}$Rn of local origin. This will provide the quantity of remote $^{222}$Rn present in the measuring site Z.

Figure 2:
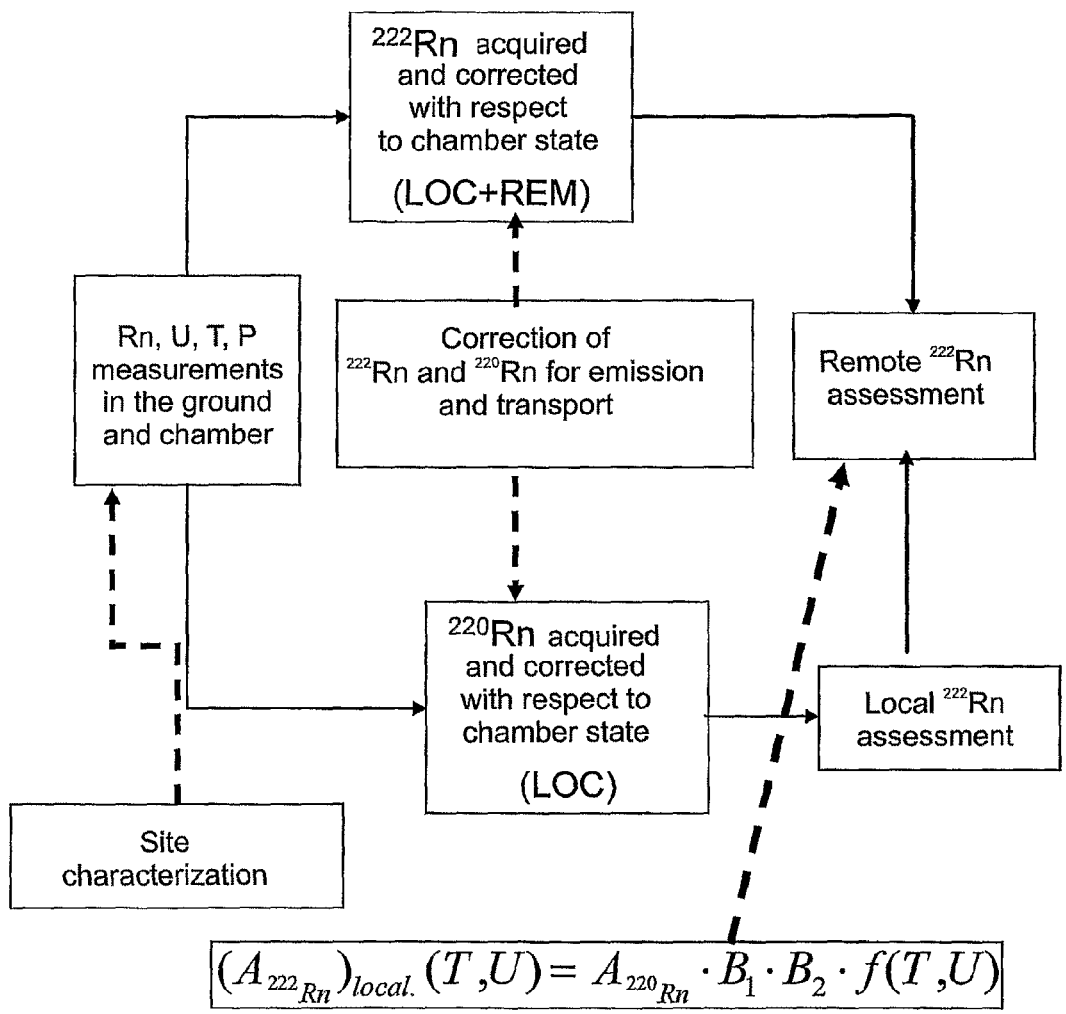
FIG. 2 is a schematic view of the method of detection of the remote origin fraction of $^{222}$Rn present in the measuring site.

The method carried out by the above described apparatus will be now described, with reference to the schematic view of FIG. 2.

The first step of the method is the analysis of the site Z to determine the typical ratio between the $^{222}$Rn of local origin and the $^{220}$Rn of local origin, and is based on an assumption of geomorphological homogeneity of the site Z within a distance and a depth from the drawing point at least equal to the length of $^{222}$Rn diffusion in that kind of ground.

This analysis is performed by a preliminary collection of ground samples from the site Z and performance of laboratory measurements thereon, in view of determining the way in which exhalation of radon and thoron from the ground is affected by ambient conditions. This analysis allows a determination of the above "typical ratio", which is defined as the ratio between the emission coefficients $\epsilon_{222_{Rn}}/\epsilon_{22_{Rn}}$ of the two isotopes.

Particularly, the typical ratio $\epsilon_{222_{Rn}}/\epsilon_{220_{Rn}}$ is obtained through the following three steps:

measurement of activity concentration of the precursor radionuclides of $^{222}$Rn and $^{220}$Rn, i.e. $^{226}$Ra and $^{230}$Th respectively, in the ground samples;

measurement of the emission coefficients of radon $\epsilon_{222_{Rn}}$ and thoron $\epsilon_{220_{Rn}}$ for each of the collected ground samples;

analysis of the change of emission coefficients of radon $\epsilon_{222_{Rn}}$ and thoron $\epsilon_{220_{Rn}}$ with temperature and humidity, using an appropriate apparatus for controlling and adjusting such parameters in the samples being measured.

More specifically, $^{226}$Ra and $^{230}$Th concentrations are determined by gamma spectroscopy, and are used to calculate the $^{222}$Rn and $^{220}$Rn fractions emitted by the sample. For this purpose, the ground sample, sieved and dried, is sealed in a radon-impervious container, until reaching an equilibrium between $^{226}$Ra and its short-to-medium half-life descendants, including $^{222}$Rn. This time is also sufficient for reaching an equilibrium between the radionuclides of the $^{232}$Th series, including $^{220}$Rn and their precursors.

The activity concentrations of the samples, expressed in Bq/m$^3$ are determined by the following relations:

$$C_{Ra-266} = \frac{A_{Ra-226}}{M_c} \text{ and } C_{Th-232} = \frac{A_{Th-232}}{M_c} \quad (1)$$

where A indicate the measured activities and M$_c$ is the volume of the ground samples.

Concerning the emission coefficient, it is defined as the average fraction of $^{222}$Rn atoms, as measured upon radium decay within the material, which radium comes out of the grains to the air or water within the interstices or pores of the solid matrix.

Experimentally, the emission coefficient c may be determined by the ratio of the following quantities:

concentration of radon or thoron in equilibrium with its precursor;

concentration of $^{226}$Ra and $^{232}$Th in the sample, using the relations (1).

The concentration of radon or thoron in equilibrium with its precursor is measured by the apparatus 1 of the present invention.

The equilibrium between radon and the precursor may be reached by introducing a sample of the material to be analyzed, appropriately homogenized, in the measuring chamber 2 and sealing it therein. The internal sensors 3 allow to monitor temperature and pressure during the emission process, which is influenced by such parameters. The concentrations of radon and thoron within the chamber 2 are measured by analyzing the alpha spectra of the decay products of radon and thoron respectively, within the chamber 2. At least 20 days' permanence of the sample in the chamber ensures that equilibrium is reached for both isotopes.

Figure 3:
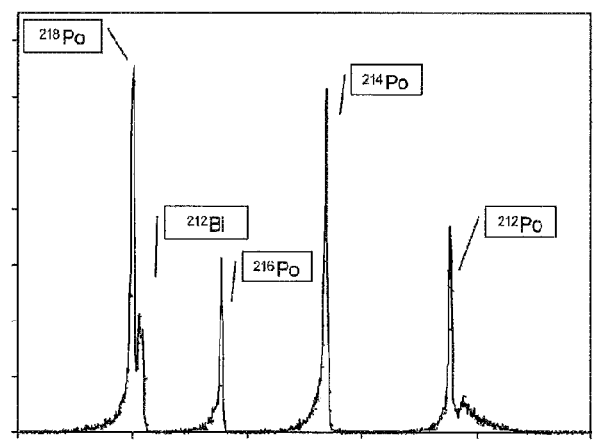
FIGS. 3 and 4 are graphic representations of alpha spectroscopy measurements.

In a typical alpha spectrum, as shown in FIG. 3, the contributions of the direct descendants of $^{222}$Rn and $^{220}$Rn under examination are shown by the areas of the lines characteristic of $^{218}$Po and $^{216}$Po respectively. The excellent energetic resolution of the spectrum, which is obtained also thanks to the above mentioned accuracy, which is afforded by the type of connection between the measuring chamber 2 and the computer 5, allows separate measurement of the two isotopes $^{218}$Po and $^{216}$Po.

Figure 4:
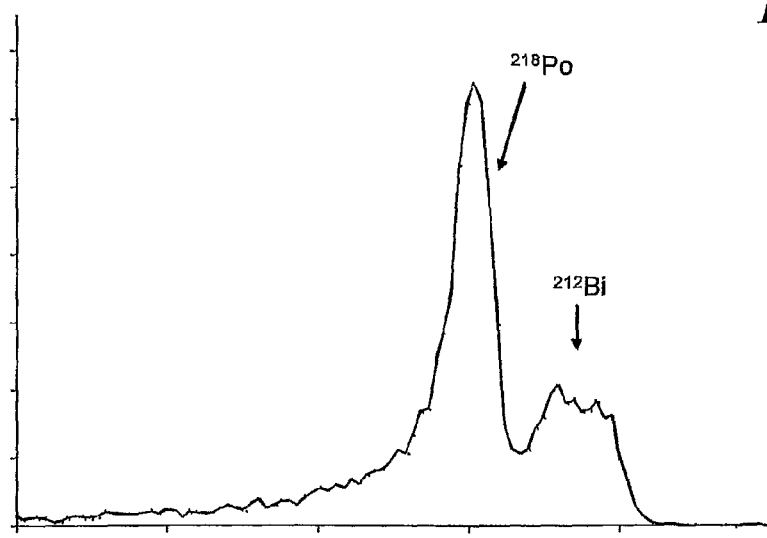

FIG. 4 shows that the $^{218}$Po line is followed by the $^{212}$Bi line which interferes and forms a doublet with the former. This condition is obviated by an appropriate deconvolution algorithm. particularly, the computer calculates the deconvolution of the spectrum by describing each line as the sum of a Gaussian function and an exponential curve.

The curve of $^{222}$Rn concentration to equilibrium is given by the solution of the following equation:

$$\frac{dC(t)}{dt} = \frac{E_m}{V_u} - \lambda C(t)$$

where the initial concentration C(0) is assumed to be zero, E$_{Rn}$ is the exhalation velocity defined as the amount of gas that comes out of the sample in a unit of time, V$_u$=V$_{tot}$−M$_c$ is the useful volume of the chamber 2 and is equal to the entire volume of the chamber 2 less the volume of the ground sample M$_c$. $\lambda$ is the decay constant of the isotope.

The solution of the equation may be expressed by the following function:

$$C(t) = \frac{E_m}{\lambda V_u}(1 - e^{-\lambda t})$$

where $$\frac{E_{Rn}}{\lambda V_u}$$

is the value of concentration at equilibrium and is obtained by adapting experimental data to this function.

In a perfectly isolated system and with no back-diffusion, this would be a useful value for determining the emission coefficient. An analysis of the overall curve growth allows verification of the value of $\epsilon$ and also allows checking for noise or, failing this, allows warning about their presence and provides the chance of repeating measurements.

A known procedure would lead to the same result in a shorter time, by exploiting the linearity of the curve section corresponding to the first 12 hours' growth, but a lower accuracy would be obtained in this case.

In any case, the procedure would have to be repeated to obtain various humidity and temperature values.

Therefore, ground characterization is essentially based on the measurement of the emission coefficients of radon ($\epsilon_{222_{Rn}}$) and thoron ($\epsilon_{220_{Rn}}$), as described above, as ambient conditions change. These measurements are performed by adjusting the temperature within the sample in a range from 0° to 45° C. and the humidity in a range from 5% to 100%.

The result of these measurements is the determination of functional dependency of the emission coefficient $\epsilon(T, U)$ for both isotopes, on temperature and humidity. This will provide the typical ratio between the emission coefficients of radon and thoron $$f(T, U) = \frac{\epsilon_{222_{Rn}}}{\epsilon_{220_{Rn}}},$$

also as a function of the above ambient parameters.

Once the analysis of the measuring site Z has been completed, the monitoring stage can start, which practically consists in continuous measurement of radon and thoron from the ground. This measurement, performed at predetermined intervals, is based on alpha spectroscopy, which provides the average activity of $^{222}Rn$ and $^{220}Rn$ from the ground.

At the same time, temperature, pressure and humidity in the measuring site Z are also detected.

The experimental data provides the average ratio $f_{exp}$ between the activities of radon and thoron in the ground and their variation with time, according to the following relation:

$$f_{exp} = \frac{(A_{222_{Rn}})_{local} + (A_{222_{Rn}})_{remote}}{A_{220_{Rn}}}$$

where $(A_{222_{Rn}})_{local}$ and $(A_{222_{Rn}})_{remote}$ are the average activities of local and remote origin radon respectively and $(A_{220_{Rn}})$ is the average activity of thoron, which is necessarily of local origin, due to its short half-life, lower than 60 s.

The contribution of local origin $^{222}Rn$ may be related to the ratio between the emission coefficients $f(T, U)$, with measured temperature and humidity values and with the results of the analysis of the measuring chamber 2.

The above accounts for the following:

the quantities of radon and thoron emitted in the site Z proximate to the drawing point and sucked through the measuring chamber 2, depend on their respective diffusion lengths, which are equal to $$L_i = \sqrt{\frac{D_i}{\lambda_i}},$$

where $D_i$ is the diffusion coefficient and $\lambda_i$ is the decay constant of the corresponding isotope;

part of the radon and thoron decays within the suction pipe before reaching the measuring chamber 2;

measurements of temperature and humidity proximate to the measuring site can be used to correct the ratio between the emission coefficients $f(T, U)$, whose dependency on ambient parameters has been determined upon analysis of the site Z.

Based on the above, it can be assumed that:

$$(A_{222_{Rn}})_{local}(T,U) = A_{220_{Rn}} \cdot B_1 \cdot B_2 \cdot f(T,U)$$

where:

$B_1$ is $$\sqrt{\frac{\lambda_{thoron}}{\lambda_{radon}}},$$

with $\lambda_{radon}$ and $\lambda_{thoron}$ being the decay constants of radon and thoron, respectively. The coefficient $B_1$ numerically quantifies the quantities of radon and thoron emitted in the site Z proximate the drawing point and is equal to the ratio between the diffusion distances of radon and thoron. In its determination, it was considered that the two isotopes have a practically identical diffusion constant, excepting a negligible factor, $B_2 = \exp(-\lambda_{radon} + \lambda_{thoron}) \cdot t_{pipe}$ is a coefficient based on the fact that part of the radon and the thoron decays in the suction pipe before reaching the measuring chamber 2, $t_{pipe}$ being the characteristic time before an atom close to the measuring site Z enters the measuring chamber through the suction pipe. This is equal to $$t_{ppipe} = \frac{V_{pipe}}{\Phi},$$

where pipe is the pipe volume and $\Phi$ is the sucked flow rate.

Once the local contribution of $^{222}Rn$ is known, it can be subtracted from the total contribution thereof, so that remote origin $^{222}Rn$ may be estimated, which value may be related to strictly geophysical phenomena.

According to another aspect of the invention, during detection of radioactive particles, simultaneous detection of the ambient parameters of pressure, temperature and humidity of the zone to be monitored Z allows measurement correction.

This improves accuracy in the measurement of remote origin $^{222}Rn$ concentration, and nullifies ambient influences on the detections.

Particularly, the emission coefficients of local origin $^{222}Rn$ and $^{220}Rn$ have a value corrected by an error coefficient selected from those contained in a table containing correction coefficients values depending on changing humidity, pressure and temperature in the zone Z to be monitored.

This table is specifically determined by experimental tests, by analyzing the behavior of emission coefficients with changing ambient parameters.

The accuracy of detection of the remote origin fraction of $^{222}Rn$ is further improved by also detecting, in the same time intervals, the ambient parameters of pressure, temperature and humidity within the measuring chamber 2.

Particularly, the effectiveness of alpha spectroscopy has a value selected from those of a table containing different efficiency values depending on changing humidity, pressure and temperature within the chamber 2.

To this end, the step of analysis in the chamber 2 is performed in a laboratory measuring the efficiency as these ambient parameters change.

As mentioned above, these ambient parameters of pressure, temperature and humidity are detected using a first 3 and a second 4 plurality of sensors.

From the foregoing, it is understood that the method of detection of the remote origin fraction of $^{222}Rn$ in a zone to be monitored, and the apparatus for carrying out such method, fulfill all the intended objects and particularly meet the requirement of correctly and accurately detecting such radioactive $^{222}$Rn particles.

Both the method and apparatus of the invention have proved to allow detection of the remote origin fraction of $^{222}$Rn by discriminating it from the one emitted locally in the zone being monitored.

It was also found that particularly accurate measurements may be obtained by correcting the distortion effect of ambient parameters both inside and outside the measuring chamber used for radioactive particle detection.

The method and apparatus of the invention are susceptible to a number of modifications and changes, other than those described above, all falling within the inventive concept disclosed in the appended claims.

Furthermore, all the details may be replaced by technically equivalent elements or steps, and any size, shape and material may be used according to various needs.

The invention claimed is:

1. A method of detecting a fraction of remote origin of $^{222}$Rn present in a measuring site (Z) for monitoring dynamic phenomena inside land crust, comprising the following steps:
   a) analyzing the measuring site (Z) in order to determine a typical ratio between $^{222}$Rn of local origin and $^{220}$Rn of local origin, said typical ratio being proportional to a ratio between an emission coefficient $\epsilon_{222_{Rn}}$ of said $^{222}$Rn of local origin and an emission coefficient $\epsilon_{220_{Rn}}$ of said $^{220}$Rn of local origin, said $\epsilon_{222_{Rn}}$ and $\epsilon_{220_{Rn}}$ being measured on ground samples collected from the measuring site (Z);
   b) measuring, at predetermined time intervals, alpha spectroscopy in the measuring site (Z) using a measuring chamber (2);
   c) elaborating said alpha spectroscopy in order to find total concentration of said $^{222}$Rn and total concentration of said $^{220}$Rn present in the measuring site (Z);
   d) determining concentration of said $^{222}$Rn of local origin by multiplying said total concentration of said $^{220}$Rn with said typical ratio; and
   e) subtracting said concentration of said $^{222}$Rn of local origin from said total concentration of said $^{222}$Rn to obtain a concentration of said fraction of remote origin of said $^{222}$Rn.

2. The method as claimed in claim 1, wherein said typical ratio is expressed by the following formula:

$$(A_{222_{Rn}})_{local}(T,U) = A_{220_{Rn}} \cdot B_1 \cdot B_2 \cdot f(T,U)$$

where:
$A_{222_{Rn}}$ is activity of $^{222}$Rn;
$A_{220_{Rn}}$ is activity of $^{220}$Rn;
T is temperature;
U is humidity;

$$B_1 = \sqrt{\frac{\lambda_{thoron}}{\lambda_{radon}}},$$

where $\lambda_{radon}$ and $\lambda_{thoron}$ are the decay constants of radon and thoron, respectively;
$B_2 = \exp(-\lambda_{radon} + \lambda_{thoron}) \cdot t_{pipe}$ is a coefficient based on the fact that part of the radon and the thoron decayed in a space comprised between the measuring site (Z) and said measuring chamber (2), $t_{pipe}$ being a characteristic time before an atom close to the measuring site (Z) enters inside the measuring chamber (2); and $$f(T,U) = \frac{\varepsilon_{222_{Rn}}}{\varepsilon_{220_{Rn}}},$$

wherein f(T, U) is the typical ratio.

3. The method as claimed in claim 1, wherein said step b) comprises detecting, in said predetermined time intervals, ambient parameters of pressure, temperature and humidity of the measuring site (Z).

4. The method as claimed in claim 3, wherein detecting the ambient parameters of pressure, temperature and humidity is carried out through one or more sensors (3, 4).

5. The method as claimed in claim 1, wherein said emission coefficient of said $^{222}$Rn and said emission coefficient of $^{220}$Rn, each presents a value corrected by a correction factor selected between correction factors of a table comprising different values of correction factors related to variations of humidity, pressure and temperature present in the measuring site (Z) and calculated by laboratory tests.

6. The methods as claimed in claim 1, wherein said step b) comprises detecting ambient parameters of pressure, temperature and humidity in said measuring chamber (2).

7. The method as claimed claim 1, wherein an efficiency of survey of alpha spectroscopy has a value selected between values of a table comprising different values of efficiency related to variations in humidity, pressure and temperature present inside of said measuring chamber (2), said table being obtained by appropriate laboratory tests within said measuring chamber (2) when there are variations in inner humidity, pressure and temperature.

8. An apparatus for detecting the remote origin $^{222}$Rn fraction present in the measuring site (Z) and for carrying out of the method according to claim 1, comprising:
   at least the measuring chamber (2) for collecting air samples drawn from the measuring site (Z) and for performing thereon the alpha spectroscopy;
   at least one first plurality of sensors (3) for detecting ambient parameters of pressure, temperature and humidity inside said measuring chamber (2);
   at least one second plurality of sensors (4) for detecting ambient parameters of pressure, temperature and humidity in the measuring site (Z);
   at least one programmable computer (5) for elaborating data coming from said first and second plurality of sensors (3, 4) and said measuring chamber (2); and
   a connection system (6) between said computer (5), said first and second plurality of sensors (3, 4), and said measuring chamber (2),
   wherein said programmable computer (5) comprises a storage unit to memorize a program computer product executable to calculate quantities of said $^{222}$Rn and of said $^{220}$Rn present in said measuring site (Z), to calculate a quantity of said $^{222}$Rn of local origin by multiplying said quantity of said $^{220}$Rn by a typical ratio between said $^{222}$Rn of local origin and said $^{220}$Rn of local origin and deducing therefrom said quantity of said $^{222}$Rn of local origin to obtain the remote origin fraction of said $^{222}$Rn.

9. The apparatus as claimed in claim 8, wherein said connection system (6) is wireless, and said measuring chamber (2) is an electrostatic collection chamber.

* * * * *